United States Patent [19]
Rodrigues

[11] Patent Number: 5,406,916
[45] Date of Patent: Apr. 18, 1995

[54] DOUBLE ACTING, RECTANGULAR FACED, ARC SHAPED, OSCILLATING PISTON QUADRATIC INTERNAL COMBUSTION ENGINE OR MACHINE

[76] Inventor: Michael V. Rodrigues, 19/21 Fosse Way, London, Great Britain, W13 OBZ GB

[21] Appl. No.: 955,870
[22] PCT Filed: Apr. 5, 1991
[86] PCT No.: PCT/GB91/00534
  § 371 Date: Dec. 7, 1992
  § 102(e) Date: Dec. 7, 1992
[87] PCT Pub. No.: WO91/15663
  PCT Pub. Date: Oct. 17, 1991

[30] Foreign Application Priority Data
  Apr. 7, 1990 [GB] United Kingdom ............... 9007940

[51] Int. Cl.⁶ ............................................. F02B 53/00
[52] U.S. Cl. ................................................. 123/18 A
[58] Field of Search ............... 123/18 A, 5.01; 92/67; 91/177

[56] References Cited

U.S. PATENT DOCUMENTS

| | | | |
|---|---|---|---|
| 1,111,605 | 9/1914 | Moss et al. | 123/18 A |
| 1,294,487 | 2/1919 | Laberge | 123/18 A |
| 2,387,467 | 10/1945 | Reiter | 123/18 A |
| 3,665,896 | 5/1972 | Crehore | 123/18 A |

FOREIGN PATENT DOCUMENTS

| | | |
|---|---|---|
| 145626 | 6/1985 | European Pat. Off. . |
| 247223 | 12/1987 | European Pat. Off. . |
| 8909871 | 10/1989 | European Pat. Off. . |
| 2297323 | 8/1976 | France . |
| 3117811 | 1/1983 | Germany . |
| 320690 | 11/1929 | United Kingdom . |

Primary Examiner—Noah P. Kamen

[57] ABSTRACT

An oscillating piston machine, specifically adapted for use as an Internal Combustion Engine, preferably for two stroke operation, or alternatively, specifically adapted for use as a compressor, or alternatively as a pump, or alternatively as a fluid driven motor, comprising a plurality of arcuate, rectangular faced, double acting, oscillating pistons, symmetrically secured to an oscillating disc supported by an oscillating flange, mounted on bearings on a long central shaft fixed to a robust wall of a crankcase housing; the oscillating flange face contains a gudgeon pin linked by a single connecting rod to the crank pin of an output crankshaft, and mounted in bearings on the same wall. Rotation of crank shaft produces oscillating motion of flange, disc, and pistons. The pistons oscillate within an annular enclosure formed by the oscillating disc, and a stationary inner concentric cylinder, bolted to a stationary disc, bolted to an outer concentric cylinder, bolted to the crankcase housing. The stationary disc has inlet and exhaust ports, and also supports similar arcuate stationary pistons, located symmetrically within annular spaces unswept by the oscillating pistons. For self charged two stroke operation the oscillating flange/disc has arcuate transfer channels/ports on either side of one oscillating piston which serves as a double acting charger.

28 Claims, 10 Drawing Sheets

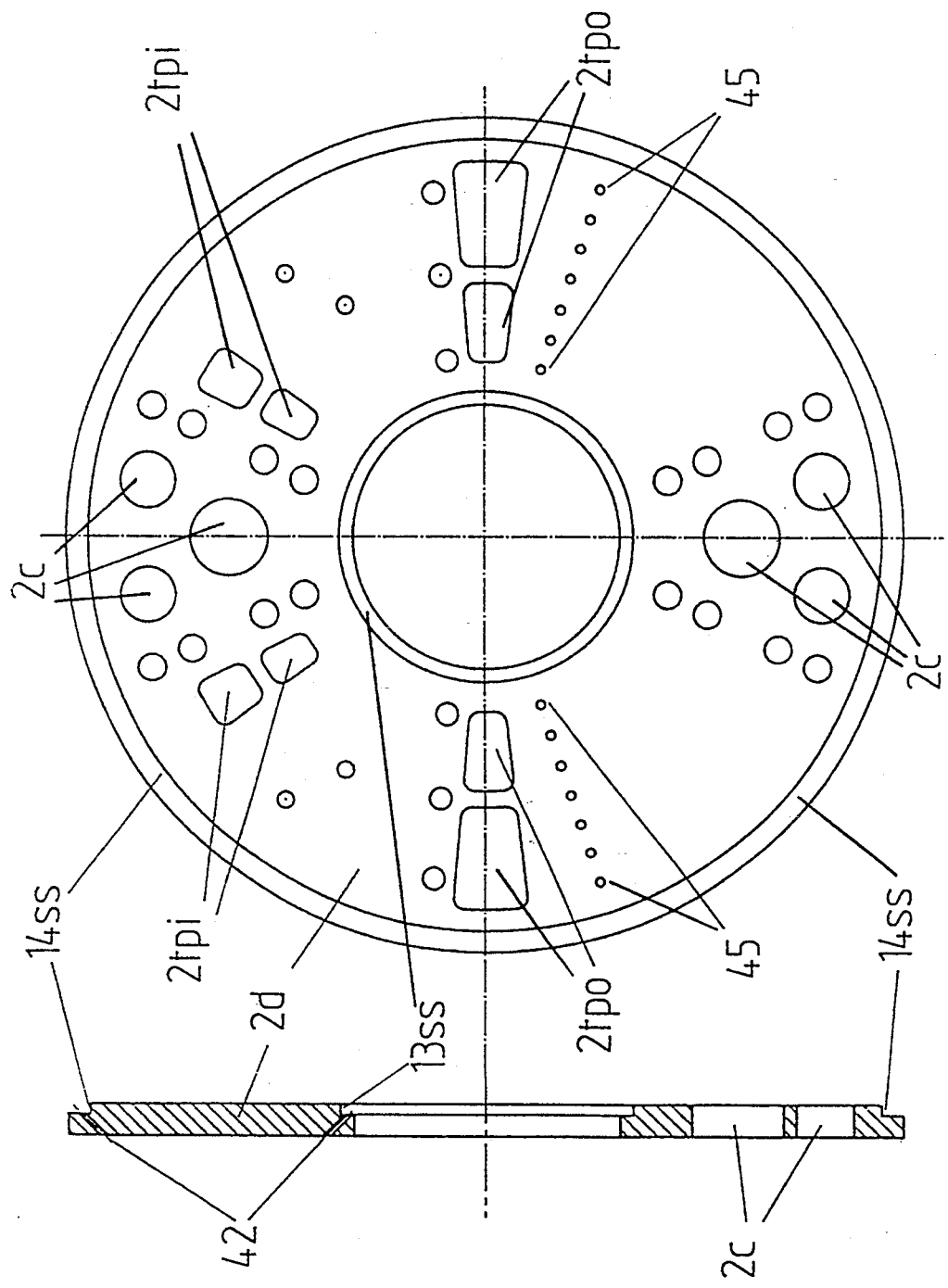

DOUBLE ACTING, RECTANGULAR FACED, ARC SHAPED, OSCILLATING PISTON QUADRATIC INTERNAL COMBUSTION ENGINE OR MACHINE

FIELD OF THE INVENTION

This invention relates to an oscillating piston machine, specifically adapted for use as an Internal Combustion Engine, preferably for two stroke operation, or alternatively, specifically adapted for use as a compressor, or alternatively as a pump, or alternatively as a fluid driven motor.

PRIOR ART

Embodiments and Shortcomings in Prior Art Absent from and Overcome by Present Invention Patent Applications for oscillating piston machines for use as internal combustion engines, compressors, pumps and motors have been disclosed as early as 1903. Inspite of the numerous advantages claimed, to date none of these inventions have appeared on the market or have been known to be commercially successful, mainly because of the technical and feasibility shortcomings inherent in their embodiments, which are listed below:

a. "circular faced" arcuate pistons—difficult to mass machine—present invention rectangular faced, arcuate pistons—easier to mass machine;

b. "cat and mouse" machines (pistons chasing pistons)—excessive number of moving links—present invention not cat and mouse, only three moving links;

c. "clap hands" pistons—sealing cumbersome—present invention "clap hands" absent—sealing simple;

d. oscillating pistons attached by "inside arcuate face"—smallest and weakest attachment face—present invention pistons supported by larger and stronger flat end face;

e. oscillating pistons "attached by outer arcuate face" to outer cylinder—high inertia problems and thermal distortion—present invention, pistons end attached to oscillating disc—significantly low inertia and low thermal distortion;

f. "unorthodox mechanisms" including "cams, gears, sliding links and ratchets" for converting oscillating into rotary movement—expensive/unreliable—absent from present invention—overcome by simple robust three moving part beam and crank mechanism.

N.B. Exhaustive searches show no anticipations of the present invention, as all prior art comprise one or more of above listed embodiments.

SUMMARY OF THE INVENTION

An oscillating piston machine comprising arcuate, rectangular faced, oscillating pistons, attached to an oscillating disc supported by a flange, mounted in bearings on a long central inner shaft, fixed to a wall of a crankcase housing. The oscillating movement is converted into rotary movement by a single connecting rod linking a gudgeon pin on the flange to the crank pin of an output crankshaft and flywheel. The annular spaces swept by the oscillating pistons are enclosed by a fixed inner concentric cylinder, bolted to a stationary disc, bolted to an outer concentric cylinder, bolted to the crankcase housing. Similar arcuate stationary pistons are provided in the stationary disc, and ports are provided for intake and exit of fluid, and adapted for use, particularly as a two stroke internal combustion engine.

The construction is simple and inexpensive to mass produce and overcomes the feasibility problems of previous oscillating piston disclosures. The inherent benefits gained, constitute a quantum leap ahead of currently available Reciprocating piston engines, Compressors and Turboshaft engines, particularly in compactness, power to weight ratio, simplicity, parts count, materials, cost, maintenance, wear, friction, vibration, cooling, breathing, fuel efficiency and lower exhaust pollution.

BRIEF DESCRIPTION OF DRAWINGS

FIGS. 10a and 10b are a sectional view and an end view respectively of a typical oscillating disc, illustrating the stepped shoulder construction for incorporating the disc sealing rings.

DESCRIPTION

Figure 1:
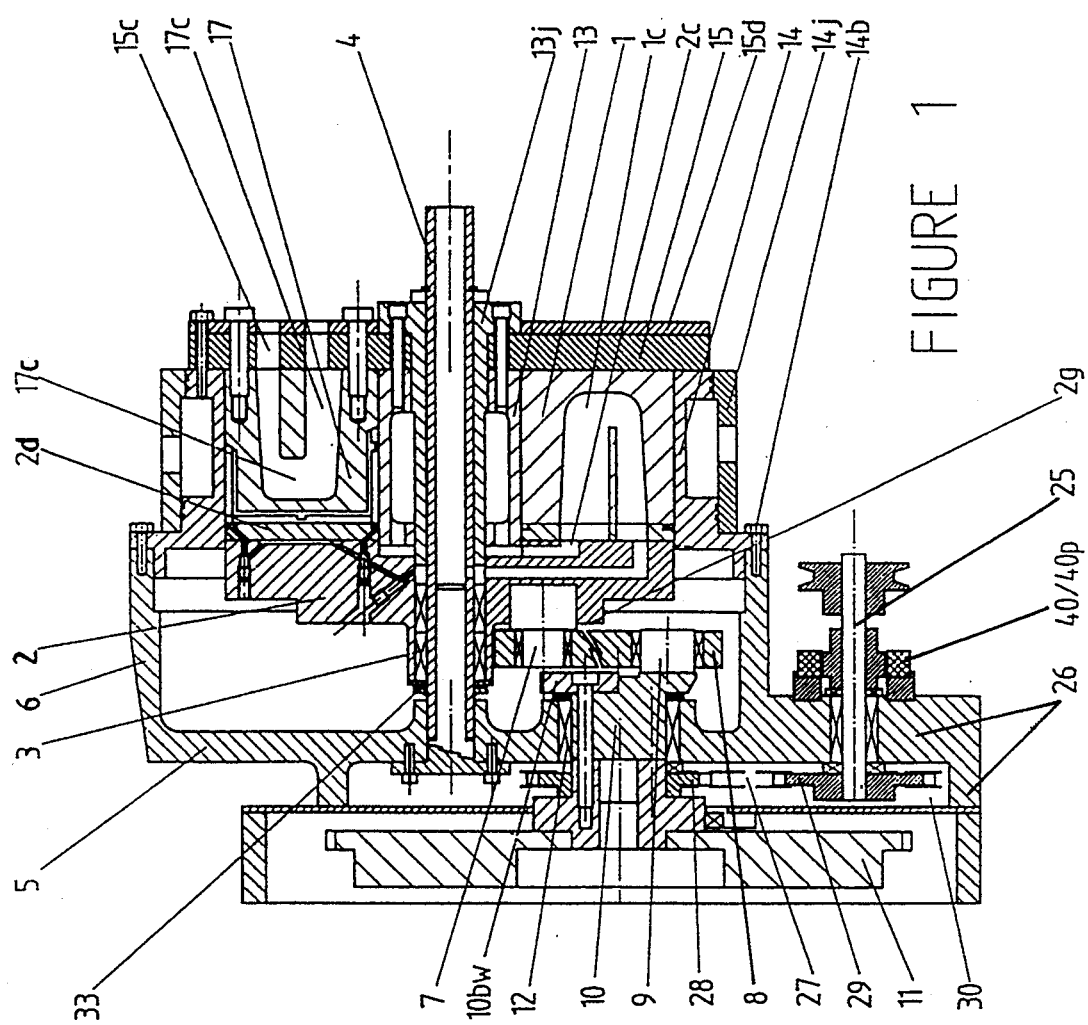
FIG. 1 is a sectional view of a general arrangement of the invention, with the flywheel and crankcase housing on the left hand side.
Figure 2:
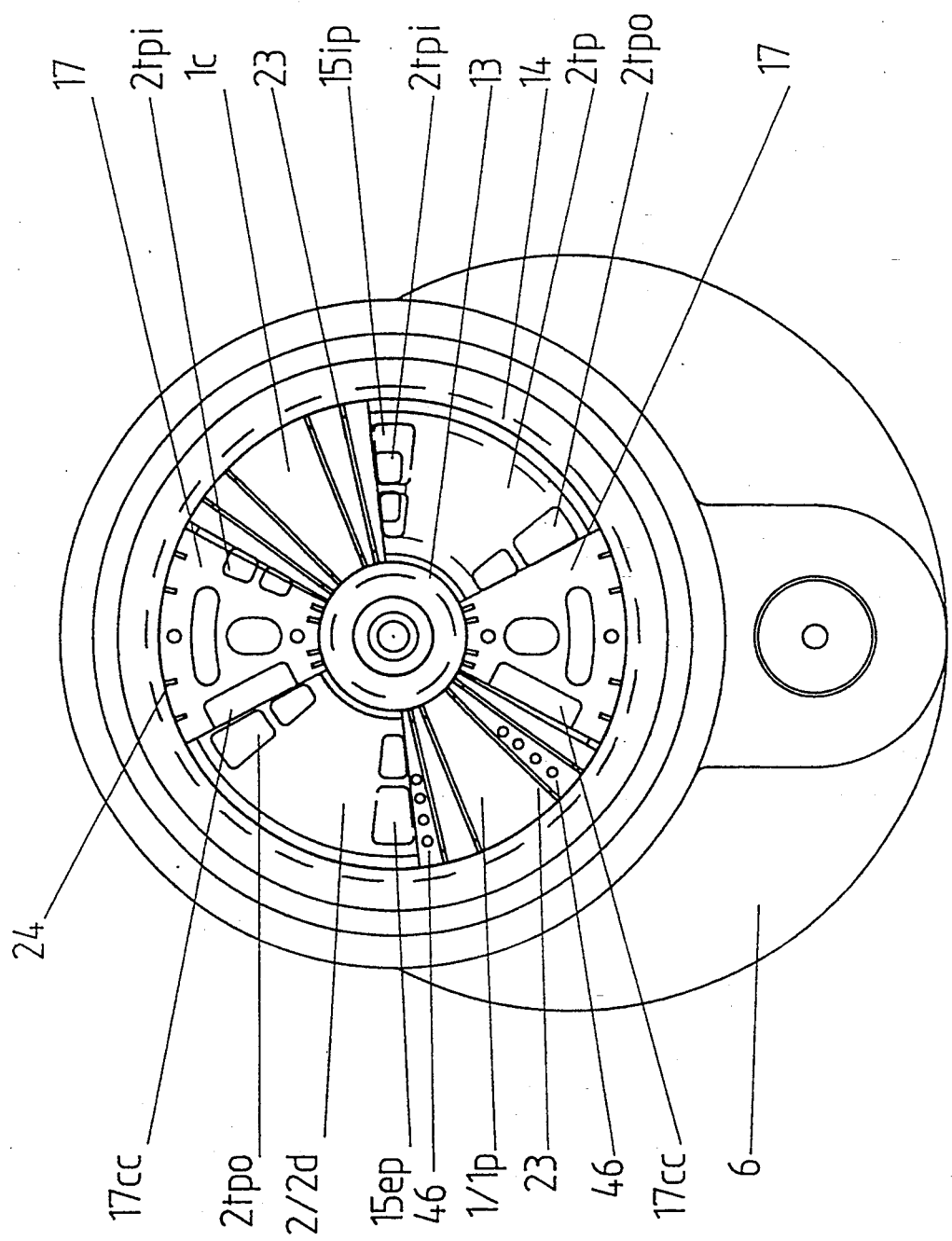
FIG. 2 is an end view of a self charged version of the engine with the cover plate and stationary disc removed, to reveal the stationary and oscillating pistons and the location of the ports.

Referring now to the drawings and in particular to FIGS. 1 and 2, unless otherwise referred, a preferred embodiment of my oscillating piston machine comprises:

A flat, circular, oscillating flange, 2, having a boss, 2b, containing internal coaxial bearings, 3, mounted coaxially on a robust long central shaft, 4, which is perpendicularly fixed and supported at one end, in a mating cylindrical hole, 5h, provided in a thick wall, 5, of a crank case housing, 6.

The shaft, 4, has at least one axial thrust bearing, 33, located between the boss, 2b, and the wall, 5.

The wall, 5, has a second cylindrical hole, 12h, parallel to the first hole, 5h, which has bearings, 12, supporting the journal, 10, of a crankshaft, 10, having a single crank pin, 9, located inside the housing, 6, between the flange, 2, and wall, 5, and supporting a flywheel, 11, located outside the housing, 6.

The face of the oscillating flange, 2, contains an axially parallel eccentric cylindrical hole, 7h, containing a gudgeon pin, 7, having a proud section, 7p, having bearings, 7b, linked to a connecting rod, 8, having big end bearings, 8b, linked to the crank pin, 9, which when rotated produces oscillating motion of the oscillating flange, 2, to a predetermined specific angle of oscillation.

The other face of the oscillating flange, 2, is flat and is coaxially attached to a flat circular oscillating disc, 2d, having a coaxial circular bore, 13h (see FIG. 10a/10b), of specific radius.

The oscillating disc, 2d, is attached to and supports a plurality of symmetrically located, arcuate, rectangular faced, double acting, oscillating pistons, 1, having inner and outer arcuate radii equal to the inner and outer radii of the oscillating disc, 2d.

The oscillating pistons, 1, and disc, 2d, are enclosed by a thick walled outer concentric cylinder, 14, bolted, 14b, at one end to the crankcase housing, 6, and bolted, 15b, at the other end to a thick flat stationary disc, 15, having a coaxial bore, 15h, mating with a coaxial guide sleeve, 13j, mounted on the other end of the long central shaft, 4.

The stationary disc, 15, is bolted, 13b, to and supports a thick walled inner concentric cylinder, 13, having an outer diameter which is a running clearance less than the inner arcuate radii of the oscillating pistons, 1, and oscillating disc, 2d, and a length equal to the combined length of the pistons, 1, and oscillating disc, 2d.

The stationary disc, 15, cylinders, 13 and 14, and oscillating disc, 2d, form a rectangular sectioned annular enclosure within which the oscillating pistons, 1, have freedom to oscillate with minimal fluid leakage, to the specific angle of oscillation, which provides for a plurality of unswept annular spaces in each of which there is snugly and symmetrically located, an arcuate, rectangular faced, double acting stationary piston, 17, securely bolted, 17b, to the inside face of the stationary disc, 15, with minimal free running clearance between the stationary pistons, 17, and the oscillating disc, 2d.

The stationary disc, 15, outside face is flat and contains coolant passages, 15c, which are covered and contained by a similar disc shaped cover plate, 15d.

The stationary disc, 15, and cover plate, 15d, contain passages, 15c, and ports, 15ip and 15ep, for the intake, 15ip, and exit 15ep, of fluid. See also FIGS. 2,3, and 4.

Referring to FIGS. 1,2,6, and 7, piston fluid pressure sealing means is provided to further minimise the minimal leakage through clearances between the pistons, 1 and 17, and annular enclosure, the piston sealing means comprising typically a plurality of leaf springs, 21, and helical springs, 22, loading overlapping radial displaced sealing blades, 25, and axial displaced sealing blades, 23 and 24, located in at least one group of three continuous connected rectangular shaped channels, 23c, 24c, and 25c, provided in the outer arcuate face 24f, the unattached flat end face, 25f, and the inner arcuate face, 23f, of the pistons, 1 and 17.

The leaf springs, 21, cause perpendicular displacement pressure on the blades, 23, 24, and 25, whilst the helical springs, 22, cause lengthwise displacement pressure on the blades, 23, 24, and 25, by springing apart the staggered cut-outs, 23c, 24c, and 25c into which the helical springs, 22, are contained.

Figure 7:
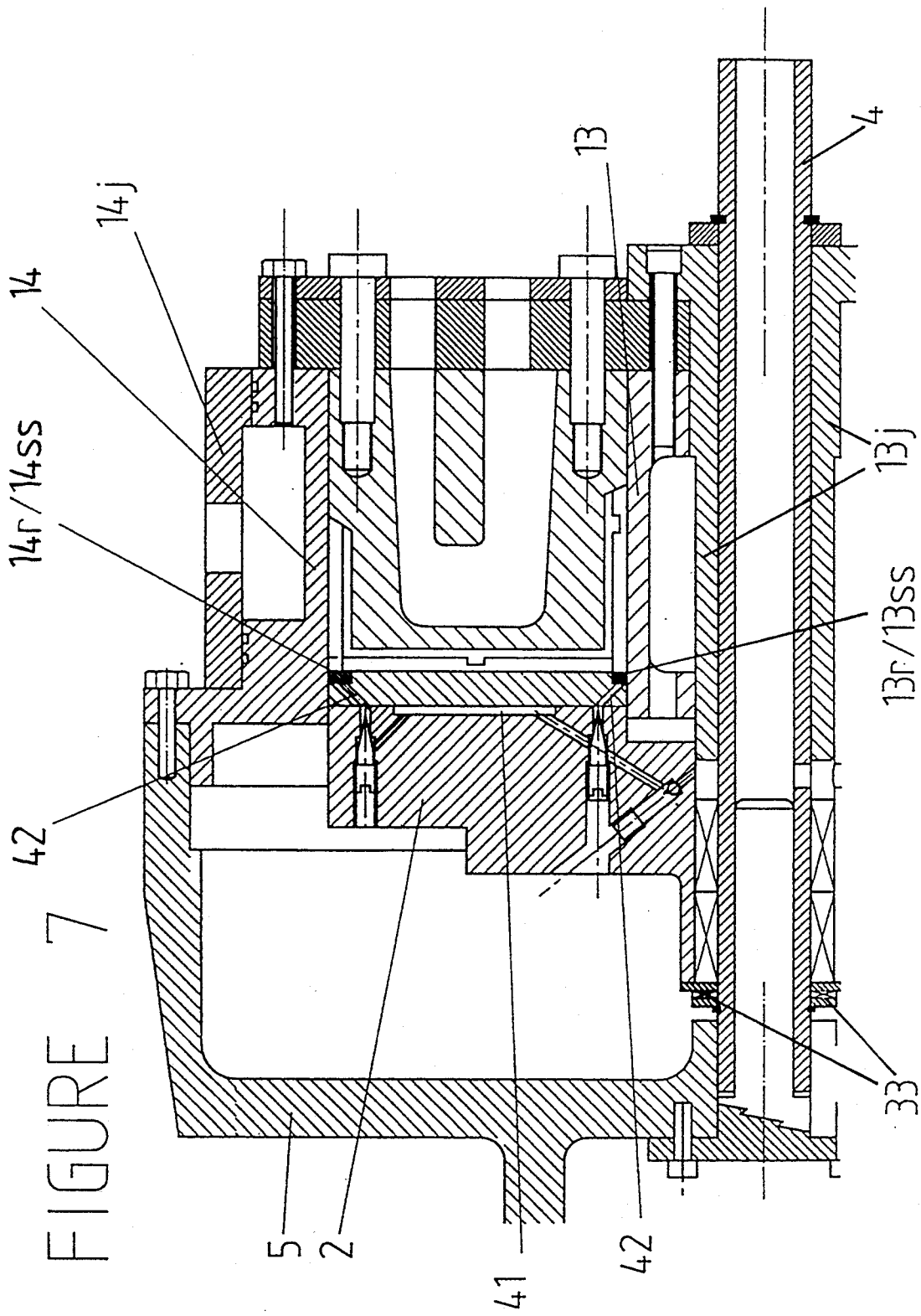
FIG. 7 is a close-up view of part of FIG. 1, showing additional features, such as cooling, sealing, and lubrication, too minute to see in FIG. 1.

Referring to FIGS. 7, 10a, and 10b, oscillating disc sealing means is provided to further minimise leakage through the minimal running clearance between the inner periphery of the oscillating disc, 2d, and the outer periphery of the inner concentric cylinder, 13, comprising typically at least one stepped shoulder, 13ss, located in the inner peripheral surface of the oscillating disc, 2d, the shoulder, 13ss, containing at least one snugly fitting inward sprung split sealing ring, 13r.

Similarly, sealing means to further minimise leakage through the minimal running clearance between the outer periphery of the oscillating disc, 2d, and inner periphery of the outer concentric cylinder, 14, comprises typically at least one stepped shoulder, 14ss, located in the outer peripheral surface of the oscillating disc, 2d, the shoulder, 14ss, containing at least one snugly fitting outward sprung split sealing ring, 14r.

Both rings, 13r, and 14r, comprise typically flat rectangular sectioned spring steel having tolerances, finish and total loss lubrication means, 42, to minimise compressed gas leakage past the disc peripheral clearance gaps under all operating conditions of the machine.

Figure 8:
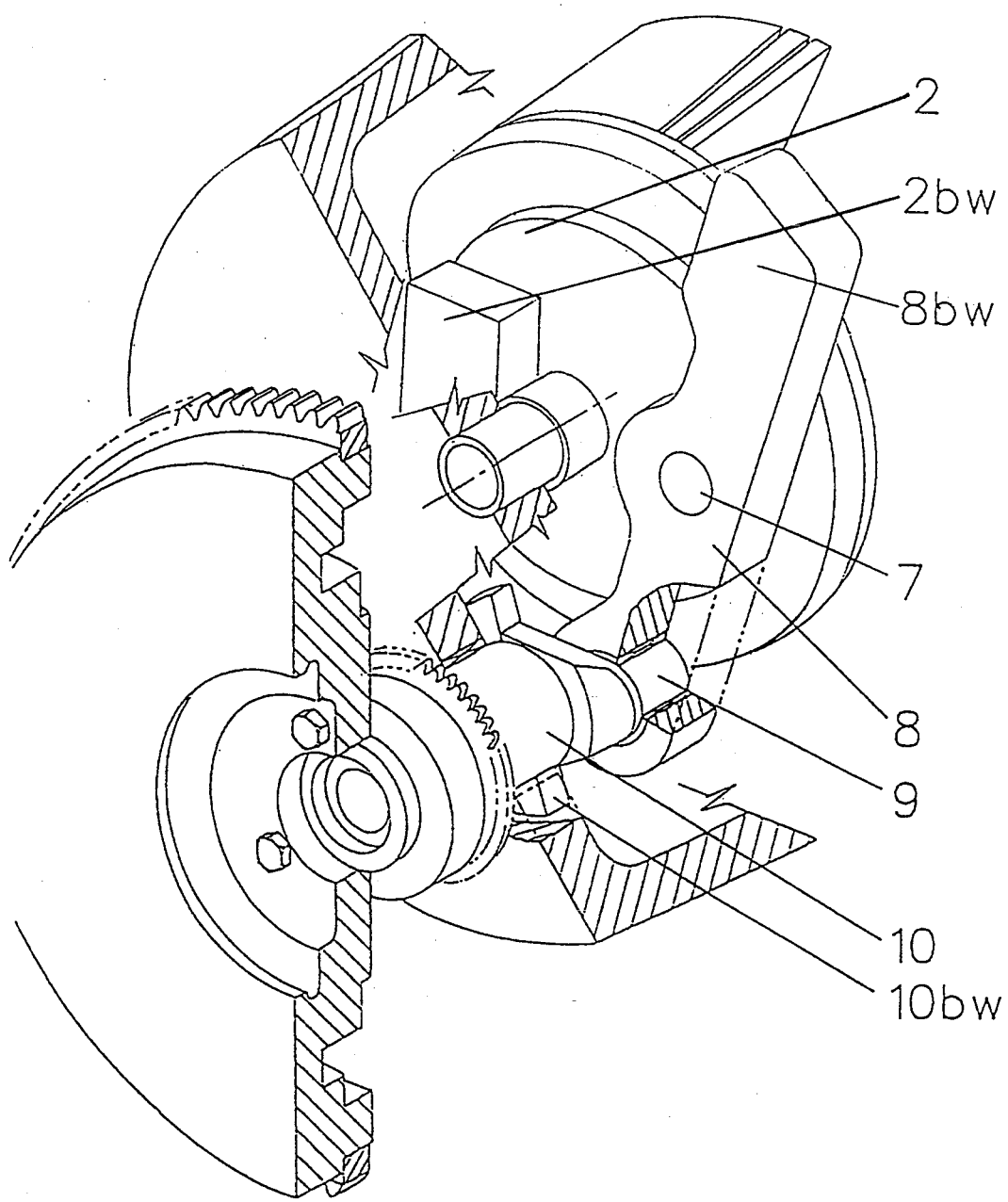
FIG. 8 is a perspective scrap sectional view showing the crankcase mechanism of the invention.

Referring to FIGS. 1 and 8, means are provided to minimise out of balance forces on the machine when operating to ensure static and dynamic balance of the connecting rod, 8, oscillating flange, 2, and crank shaft, 10, and to ensure that their respective centres of gravity remain unchanged, comprises typically:

a. a balance weight 10bw, to counter balance the mass of the crank shaft, 10, and crank pin, 9, about the axis of the crank shaft journal, 10i;

b. a balance weight, 8bw, to counter balance the mass of the connecting rod, 8, about the axis of the gudgeon pin, 7; and c. a balance weight, 2bw, to counter balance the combined mass of the gudgeon pin, 7, plus mass of the connecting rod, 8, and the connecting rod balance weight, 8bw, about the axis of the oscillating flange, 2.

Figure 3:
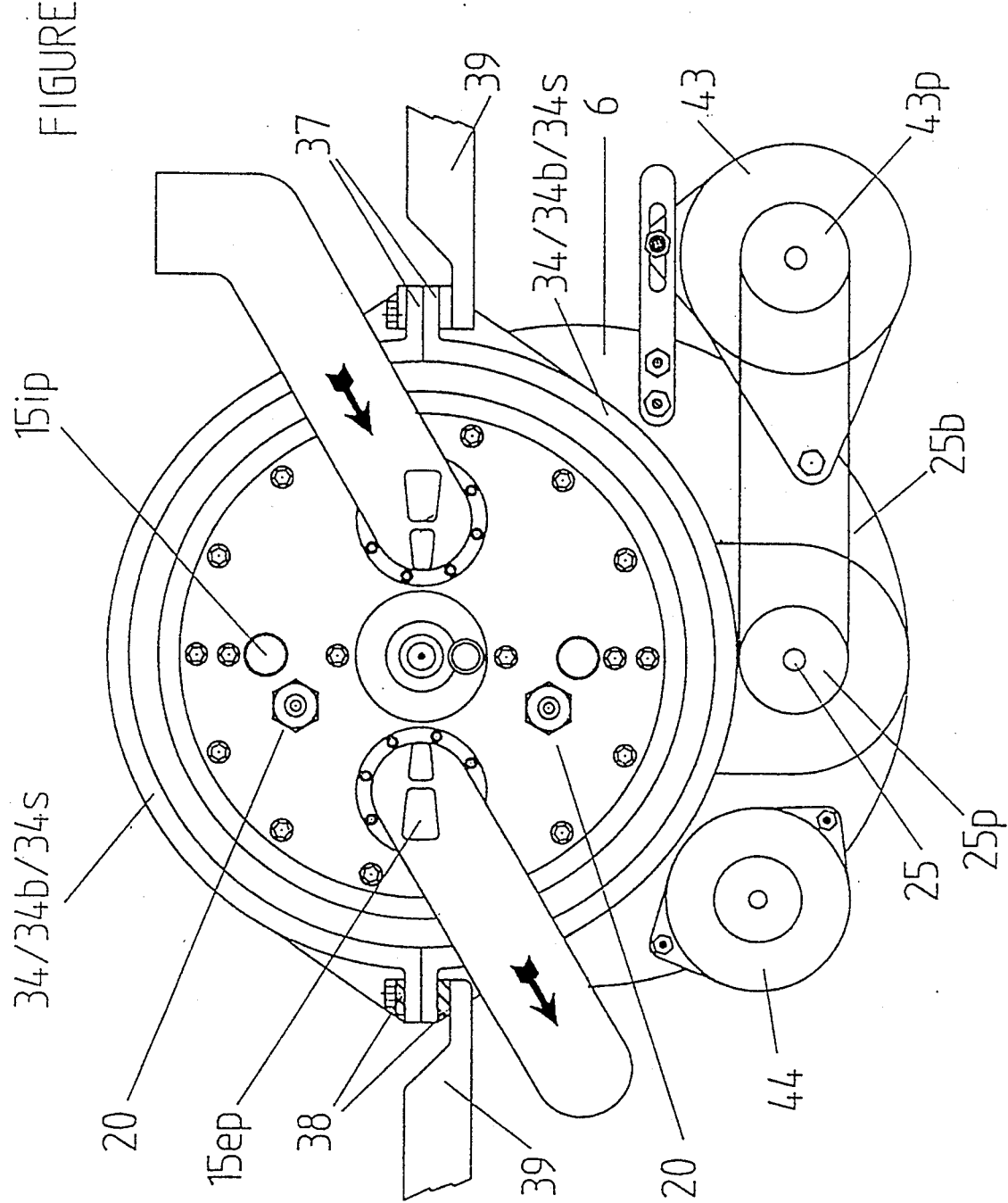
FIG. 3 is an end view of a self charged version of the engine with the stationary disc and cover plate assembled. It also illustrates a communal inlet pipe and a communal exhaust pipe. Also shown is an anti-vibration engine mounting and the location of auxiliaries including the starter motor and alternator.
Figure 4:
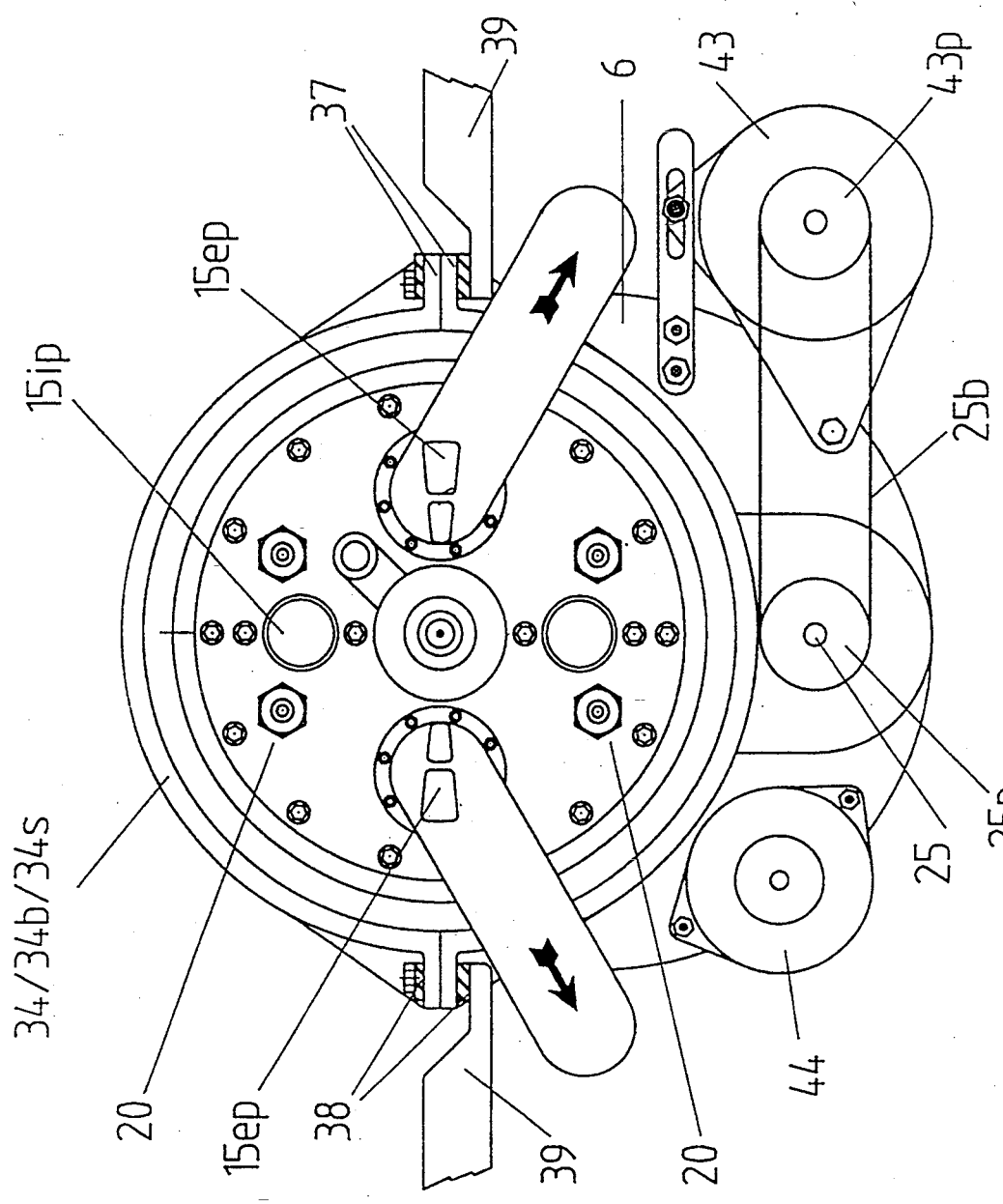
FIG. 4 is a similar view to FIG. 3, for an externally charged version of the engine.

Referring to FIGS. 3 and 4, means are provided to coaxially support the machine about the centre of oscillation, to inhibit oscillating impulses from the machine from being transmitted to the supporting installation base, 39, comprising typically at least one mounting bracket, 37, having a sleeve bearing, 34s, coaxial with the long central shaft, 4, to support the machine, typically around the outer concentric cylinder jacket, 14j.

Referring to FIGS. 1, 5b, 5c, 7, 10a, and 10b, cooling means is provided, comprising typically a. coolant passages, 1cp and 17cp, contained within the pistons, 1 and 17 respectively;

b. coolant passages, 2cp, contained between the oscillating disc, 2d, and the oscillating flange, 2;

c. coolant passages (not shown) contained between the stationary disc, 15, and the cover plate, 15d;

d. the provision of a sealed coaxial cylinder, 14j, enclosing the outer concentric cylinder, 14, containing a coolant passage, 14p;

e. the provision of a sealed coaxial cylinder on inside of the inner concentric cylinder containing a coolant passage, 14p; and f. the provision of external air cooled fins (not shown) located on external components of the machine, requiring air cooling.

Referring to FIG. 1, a lubrication oil bath means, 6b, is provided to lubricate the bearings, 3, 33, 7b, 12, and 8b, located in the crankcase housing, 6, and oil bath, 30, for lubricating the sprockets, 28 and 29, and chain 27, in timing case, 30.

Alternatively, the bearings in the crankcase housing, 6, are plain oil pressure lubricated bearings provided with means for oil pressure lubrication (not shown).

Figure 5A:
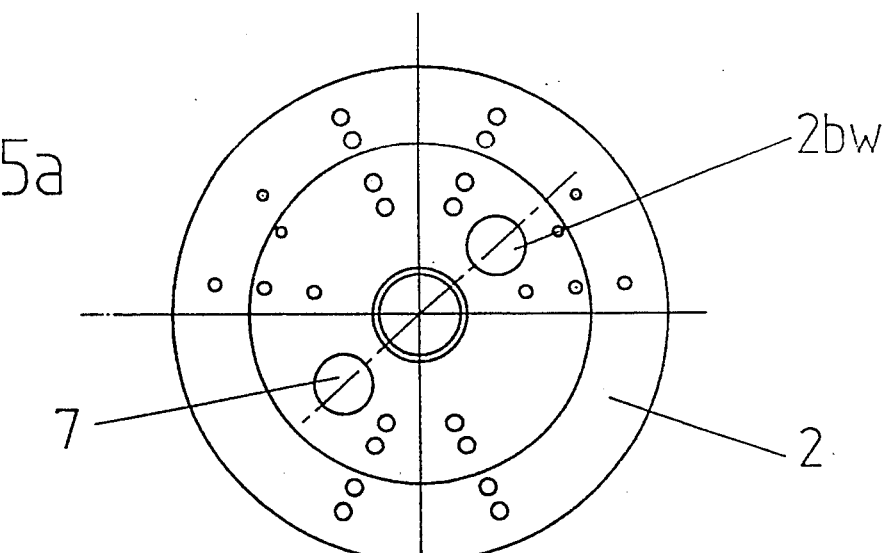
FIGS. 5a, 5b and 5c are three views of a typical oscillating flange.
Figure 5B:
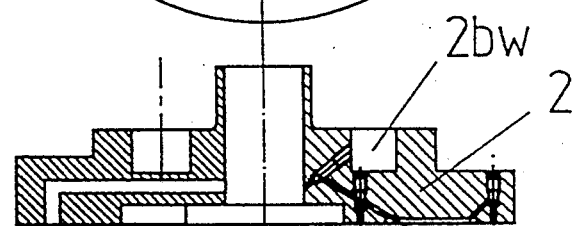
Figure 5C:
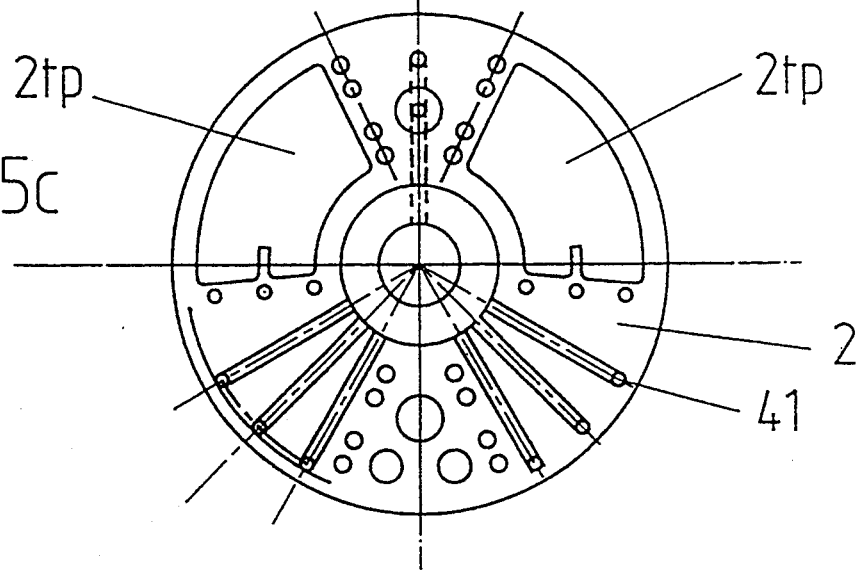
Figure 6:
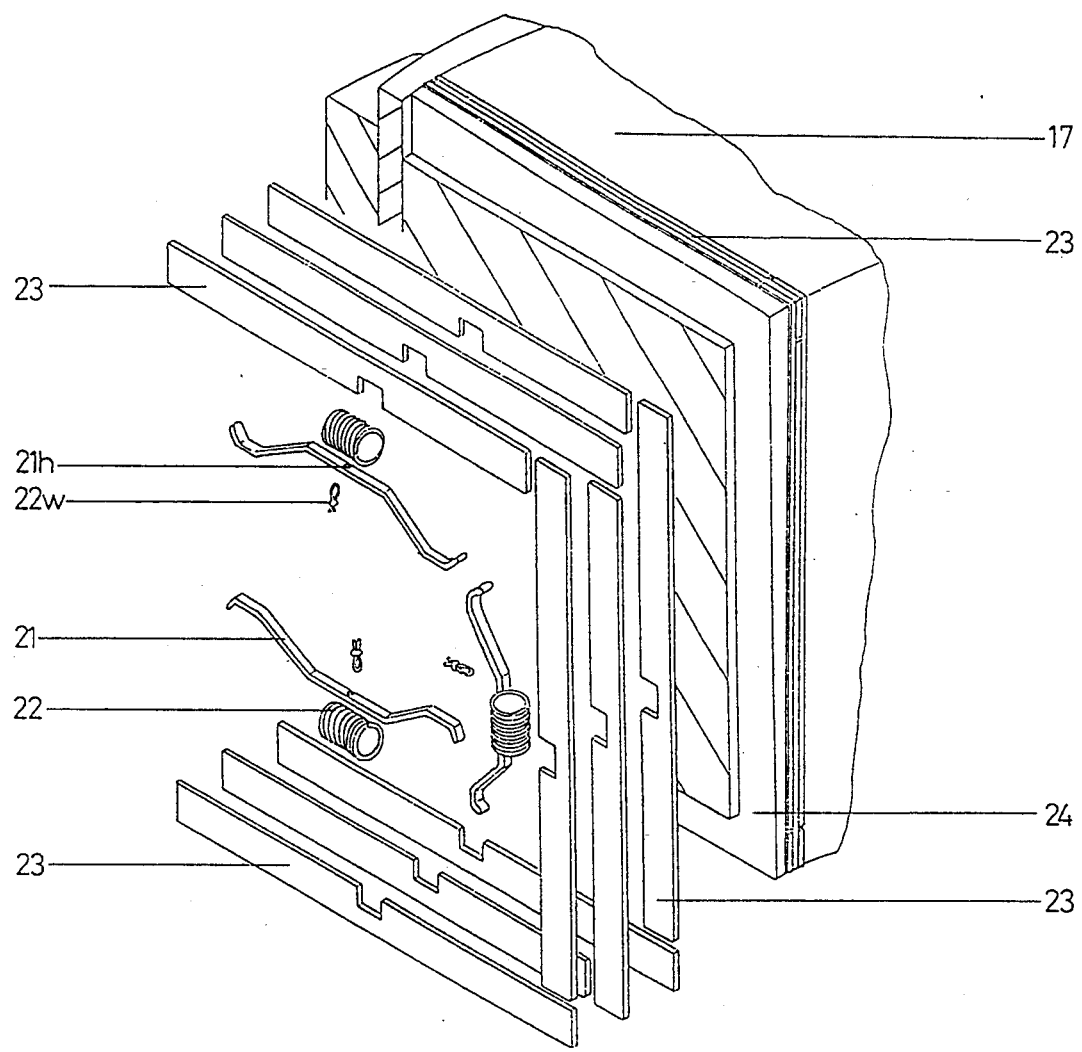
FIG. 6 is a perspective exploded assembly view, illustrating the piston sealing blades, sealing blade helical and leaf springs, a cutaway view of a sealing blade channel, and an outside view of the blades assembled in a channel.

Referring to FIGS. 1, 5*b*, and 7, a separate total loss lubricating means is provided to lubricate the piston sealing blades, 23, 24, and 25, and the oscillating disc sealing rings, 13*r* and 14*r*, comprising typically lubricating oil fed galleries, 41, and adjustable metering screw means, 42*m*, contained in the oscillating flange, 2, and fed through the holes, 42, in the disc, 2*d*.

Referring to FIGS. 1, 5*b*, and 7, the lubricant gallery 41 (FIG. 7), and coolant passage gallery, 2*cp* and 1*cp*, (FIG. 1), contained in the oscillating flange, 2, disc, 2*d*, and piston, 1, is centrifugally displaced to utilise the centrifugal forces of the oscillating motion to pump the lubricant and coolant, preferably assisted by the provision of non-return ball valve, typically 42*n*, located in each lubricant and coolant circuit.

The machine is provided with internal and external means to specifically adapt it for use as an internal combustion engine comprising typically:
a. intake air charging equipment, handling and management means;
b. engine fuel equipment, handling and management means;
c. engine ignition equipment, handling and management means;
d. engine cooling equipment, handling and management means;
e. engine lubrication equipment, handling and management means;
f. engine starter equipment, handling and management means;
g. engine exhaust equipment, handling and management means;
h. solid state electronic ignition and management means; and
i. engine combustion chamber equipment and management means.

Referring to FIGS. 2, 9, 3, and 4, the combustion chamber means comprises typically a recessed space, 17*cc*, contained in a piston, 17, each combustion chamber space provided with a spark plug, 20, typically located in a threaded hole provided in the stationary disc, 15.

Additionally, the combustion chamber space, 17*cc*, is provided with a fuel injector (not shown), typically located in a threaded hole provided in the stationary disc, 15, with fuel injection equipment means (not shown), to provide for the fuel injector.

Referring to FIG. 1, a synchronised non-slip auxiliary drive shaft means is provided, comprising typically an auxiliary drive pulley, 26*p*, an auxiliary shaft, 26, having a sprocket, 29, and chain, 27, driven by a sprocket, 28, located on the crank shaft, 10. Referring to FIG. 3 and FIG. 4, typical auxiliaries such as an alternator, 43, are driven by the belt, 26*b*, coupling the alternator pulley, 43*p*, to the auxiliary drive pulley, 26*p*.

The means for engine ignition equipment comprises typically solid state contactless electronic ignition (not shown), with pick up heads, 40*p*, and pick up rotor, 40*r*, fitted on the auxiliary shaft, 26, suitably timed and wired to fire the spark plugs, 20.

Referring to FIGS. 2, 3, 4, 5*c*, and 9, means is provided to operate the engine on the two stroke cycle, comprising typically:

a. at least one inlet port, 15*ip*, and at least one outlet port, 15*ep*, located in the stationary disc, 15, and cover plate, 15*d*;
b. and the provision of transfer passages, 2*tp*, and transfer ports, 2*tpi*, and 2*tpo*, contained in the oscillating flange, 2, and oscillating disc, 2*d*.

Referring to FIGS. 2, 3, 4, 5*c*, 9, and 10*b*, means for self charging and uniflow scavenge of the engine is provided, comprising typically:
a. at least one of the oscillating pistons, 1, serving as a double acting oscillating compressor piston, 1*c*;
b. at least one oscillating piston, 1, serving as a double acting combustion power piston, 1*p*, oscillating past a centrally located communal exhaust port, 15*ep*; and
c. at least one arcuate transfer passage channel, 2*tp*, contained in the oscillating flange, 2, located on either side of the compressor piston, 1*c*, the specific dimensions of the arcuate channel provided to enable the compressed charge to be transferred from the compressor piston, 1*c*, swept space to the power piston, 1*p*, swept space as the oscillating compressor piston, 1*c*, approaches the stationary piston, 17.

As an alternative to two-stroke operation, means is provided to enable the machine to operate on the four stroke cycle, comprising typically poppet valves (not shown), and poppet valve operating means (not shown).

Additionally, where necessary, supercharging means (not shown), are provided for supercharging the engine.

Referring to FIGS. 2 and 10*b*, internal catalytic anti-exhaust pollution means are provided comprising typically catalytic material implants, 45 and 46, located in a significant portion of quenched surface areas exposed to combustion, particularly areas subject to incomplete combustion and pollutant formation, the catalytic material comprising typically Platinum and Rhodium with an implant thickness and depth sufficient to ensure catalytic material presence inspite of wear caused by the piston sealing blades. Typical location of the implants are the piston headland surface area, 46,—(the area located between the foremost pressure piston sealing blade channels and piston face exposed to combustion). The implant operating temperatures are controlled by the piston coolant which is preferably maintained at a temperature at which the catalyst is active, without being in jeopardy.

Figure 9:
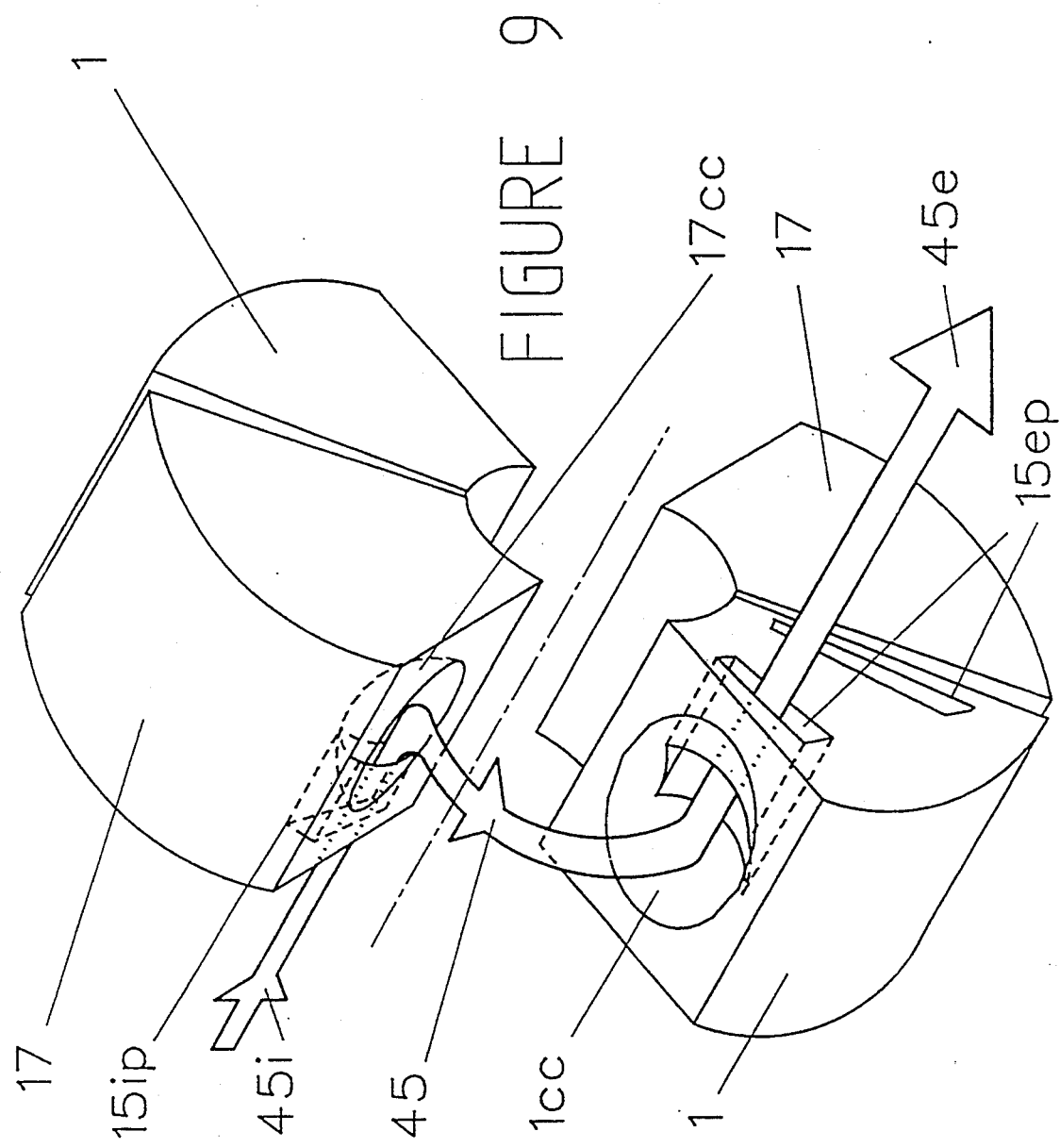
FIG. 9 is a perspective ghost view showing the ported piston uniflow scavenge flow paths.

Referring to FIG. 9, as an additional alternative for improving scavenging, the combustion chamber recessed spaces, 17*cc* and 1*ccp*, are provided with communicating ports, 17*ccp*, and 1*ccp*, respectively, located in the piston head lands. During the scavenge process, typical the gas flow paths, 16, 18, and 19, are as illustrated in FIG. 9.

As an alternative to Internal Combustion Engine operation, means is provided to specifically adapt the machine for use as a compressor, comprising non-return one-way valves, typically reed valves, or spring loaded poppet valves (not shown), provided in the fluid inlet and outlet passages.

Alternatively, means are provided to specifically adapt the machine for use as a pump to pump gases and liquids.

Alternatively, means are provided to specifically adapt the machine for use as a fluid driven motor by supplying it with compressed fluids, typically compressed hydraulic fluid, or compressed air.

Alternatively, the bearings provided in the crankcase housing, 6, typically comprise needle roller bearings, or ball bearings.

As an alternative to liquid cooling, a plurality of air cooled fins (not shown), located conveniently on external components of the engine subject to heat, are provided for cooling the machine.

As a convenient alternative, to facilitate gas flow and breathing, particularly in high power output machines, ports (not shown) are provided in the outer concentric cylinder, 14.

As a further convenient enhancement to assist gas flow and breathing, particularly for large diameter machines, ports (not shown) are also provided in the inner concentric cylinder, 13.

I claim:

1. An oscillating piston machine adapted for use in one of an engine, compressor, or pump, and having in combination:
   a. a flat circular oscillating flange having a boss containing internal coaxial bearings mounted coaxially on a robust long central shaft;
   b. said shaft is perpendicularly fixed and supported at one end in a mating cylindrical hole provided in a thick wall of a crank case housing;
   c. said shaft has at least one axial thrust bearing located between said boss and said wall;
   d. said wall has a second cylindrical hole parallel to first hole, located a specific distance apart;
   e. said second hole has bearings supporting the journal of a crankshaft, having a single crank pin located inside said housing between said flange and wall, and a flywheel, located outside said housing;
   f. the face of said oscillating flange contains an axially parallel, eccentric cylindrical hole containing a gudgeon pin having a proud section with bearings linked to a connecting rod, having big end bearings, linked to said crank pin, which when rotated produces oscillating motion of said oscillating flange to a predetermined specific angle of oscillation;
   g. the other face of said oscillating flange is flat and is coaxially attached to a flat circular oscillating disc having a coaxial circular bore of specific radius;
   h. said oscillating disc is attached to and supports a plurality of symmetrically located, arcuate, rectangular faced, double acting oscillating pistons having inner and outer arcuate radii, equal to the inner and outer radii of said oscillating disc;
   i. said oscillating pistons and disc are enclosed by a thick walled outer concentric cylinder, bolted at one end, to said crankcase housing and bolted at the other end, to a thick flat stationary disc, having a coaxial bore mating with a concentric guide tube around the other end of said long central shaft;
   j. said stationary disc is bolted to and supports a thick walled inner concentric cylinder, having an outer diameter which is a running clearance less than the inner arcuate radii of said oscillating pistons and disc, and a length equal to the combined length of said pistons and disc;
   k. said stationary disc, concentric cylinders, and oscillating disc form a rectangular sectioned annular enclosure within which said oscillating pistons have freedom to oscillate with minimal fluid leakage, to said specific angle of oscillation;
   l. said specific angle of oscillation provides for a plurality of unswept annular spaces, in each of which there is snugly and symmetrically located, an arcuate, rectangular faced, stationary piston, securely bolted to the inside face of said stationary disc, with minimal free running clearance between said stationary pistons and said oscillating disc;
   m. said stationary disc outside face is flat and contains fluid passages which are covered and contained by a similar disc shaped cover plate and
   n. said stationary disc and cover plate contain passages and ports for the intake and exit of fluid.

2. A machine as in claim 1, wherein piston fluid pressure sealing means is provided to further minimise said minimal leakage through clearances between said pistons and annular enclosure, said piston sealing means comprising a plurality of spring loaded overlapping radially and axially displaced sealing blades located in at least one group of three continuous connected rectangular shaped channels provided in the outer arcuate face, the unattached flat end face, and the inner arcuate face respectively, of said pistons.

3. A machine as in claim 2, wherein oscillating disc, peripheral fluid pressure sealing means is provided:
   a. to further minimise the minimal running clearance gap between the inner periphery of said oscillating disc, and the outer periphery of said inner concentric cylinder, comprising at least one stepped shoulder located in the inner peripheral surface of said oscillating disc, said shoulder containing at least one snugly fitting inward sprung split sealing ring; and
   b. to further minimise the clearance gap between the outer periphery of said oscillating disc and inner periphery of said outer concentric cylinder, comprising at least one stepped shoulder located in the outer peripheral surface of said oscillating disc, containing at least one snugly fitting outward sprung split sealing ring;

both said rings comprising flat rectangular sectioned spring steel having tolerances and finish to minimise fluid escaping past said clearance gaps under all operating conditions of said machine.

4. A machine as in claim 3, wherein means to minimise out of balance forces on said machine when operating is provided, comprising counter balance weights strategically located on said connecting rod, oscillating flange, and crank shaft to ensure static and dynamic balance of said connecting rod, oscillating flange, and crank shaft, and to ensure that their centres of gravity remain unchanged when said machine is in operation, comprising:
   a. a balance weight to counter balance the mass of said crank shaft and crank pin about the axis of said crank shaft journal;
   b. a balance weight to counter balance the mass of said connecting rod about the axis of said gudgeon pin; and
   c. a balance weight to counter balance the combined mass of said gudgeon pin plus mass of said connecting rod, and said connecting rod balance weight, about the axis of said oscillating flange.

5. A machine as in claim 4, wherein means are provided to coaxially support said machine about centre of oscillation, to inhibit oscillating impulses from said machine from being transmitted to the supporting installation base, comprising at least one mounting bracket having a sleeve bearing coaxial with said long central shaft to support said machine around outer concentric cylinder.

6. A machine as in claim 5, wherein cooling means is provided, comprising:
   a. coolant passages contained within said pistons;
   b. coolant passages contained between said oscillating disc and said oscillating flange;
   c. coolant passages contained between said stationary disc and said stationary flange;
   d. the provision of a sealed coaxial cylinder enclosing said outer concentric cylinder containing a coolant passage;
   e. the provision of a sealed coaxial cylinder on inside of said inner concentric cylinder containing a coolant passage; and
   f. the provision of at least one external air cooled fin located on at least one external component of said machine.

7. A machine as in claim 6, wherein a lubrication oil bath means is provided to lubricate said bearings located in said crankcase housing.

8. A machine as in claim 7, wherein at least one of said bearings in said crankcase housing are plain oil pressure lubricated bearings provided with means for oil pressure lubrication.

9. A machine as in claim 8, wherein a separate total loss lubricating means is provided to lubricate said piston sealing blades and said oscillating disc sealing rings, comprising lubricating oil fed galleries and metering means contained in said oscillating flange and disc.

10. A machine as in claim 9, wherein at least one said lubricant and coolant passage gallery contained in said oscillating flange and disc is centrifugally displaced to utilise the centrifugal forces of the oscillating motion to pump the lubricant and coolant, assisted by the provision of at least one non-return valve located in each lubricant and coolant circuit.

11. An engine as in claim 10, wherein said combustion chamber means comprises a recessed space contained in at least one of said pistons.

12. An engine as in claim 11, wherein said combustion chamber space is provided with a spark plug, located in a threaded hole provided in said stationary disc.

13. An engine as in claim 12 wherein said combustion chamber space is provided with a fuel injector, located in a threaded hole provided in said stationary disc, with fuel injection equipment means to provide for said fuel injector.

14. An engine as in claim 13, provided with a synchronised non-slip auxiliary drive shaft means, comprising an auxiliary shaft having a sprocket and chain driven by a sprocket located on said crank shaft.

15. An engine as in claim 14, wherein means is provided to operate said engine on the two stroke cycle, comprising:
   a. at least one inlet port and at least one exhaust port located in said stationary disc and cover plate;
   b. and the provision of transfer passages and transfer ports contained in said oscillating disc.

16. An engine as in claim 15, wherein means for self charging and uniflow scavenge of said engine is provided, comprising:
   a. at least one of said oscillating pistons serving as a double acting oscillating compressor piston;
   b. at least one oscillating piston serving as a double acting combustion power piston oscillating past a centrally located communal exhaust port; and
   c. at least one arcuate transfer passage channel contained in said oscillating disc, located on either side of said compressor piston, the specific dimensions of said arcuate channel provided to enable the compressed charge to be transferred from said compressor piston swept space to said power piston swept space as said oscillating compressor piston approaches said stationary piston.

17. An engine as in any one of claims 1 to 14 wherein means is provided to enable said machine to operate on the four stroke cycle, said means comprising poppet valves and poppet valve operating means.

18. An engine as in any one of claims 1 to 14 wherein supercharging means are provided for supercharging said engine.

19. An engine as in claims 1 to 14, wherein internal anti-exhaust pollution means are provided comprising:
   a. catalytic material implants located in a significant portion of quenched surface areas exposed to combustion, particularly areas subject to incomplete combustion and pollutants formation;
   b. said catalytic material comprising Platinum and Rhodium;
   c. said implant thickness and depth being sufficient to ensure said catalytic material presence inspite of wear caused by said piston sealing blades;
   d. said implants being located at a piston headland surface area;
   e. said implant operating temperatures are controlled by said piston coolant passage means;

20. An engine as in any one of claims 11 to 14, wherein at least one of said combustion chamber recessed spaces (mentioned in claim 11) has a communicating port located in the piston head land.

21. An oscillating piston machine as in any one of claims 1 to 10, wherein said machine is a fluid pump having non-return reed valves provided in said inlet and outlet passages.

22. An oscillating piston machine as in any one of claims 1 to 10, wherein said machine is a fluid pump having non-return spring loaded poppet valves.

23. An oscillating piston machine as in any one of claims 1 to 10 wherein internal and external auxiliary equipment, handling and management means is provided to specifically adapt said machine for use as a pump instead of an internal combustion engine.

24. A machine as in any one of claims 1 to 14, wherein the said bearings in said crankcase housing comprise needle roller bearings.

25. A machine as in any one of claims 1 to 14, wherein the said bearings in said crankcase housing comprise ball bearings.

26. A machine as in any one of claims 1 to 14, wherein a plurality of air cooling fins, located on at least one external component of the engine, are provided for cooling said machine.

27. A machine as in any one of claims 1 to 14, wherein at least one port is provided in said outer concentric cylinder.

28. A machine as in any one of claims 1 to 14, wherein at least one port is provided in said inner concentric cylinder.

* * * * *